United States Patent [19]

Ando et al.

[11] 4,095,851
[45] Jun. 20, 1978

[54] MODULATOR FOR ANTI-SKID BRAKE CONTROL SYSTEM

[75] Inventors: Masamoto Ando; Tomio Tachino, both of Toyota, Japan

[73] Assignee: Aisin Seiki Kabushiki Kaisha, Kariya, Japan

[21] Appl. No.: 747,212

[22] Filed: Dec. 3, 1976

[30] Foreign Application Priority Data

Dec. 4, 1975 Japan ................................ 50-145329
Dec. 4, 1975 Japan ................................ 50-145330

[51] Int. Cl.² ............................................. B60T 8/02
[52] U.S. Cl. .................................... 303/115; 303/68; 303/119
[58] Field of Search ............... 303/115, 119, 113, 114, 303/116, 117, 118, 61–63, 68–69, 92; 188/181, 345

[56] References Cited

U.S. PATENT DOCUMENTS 3,610,701  10/1971  Riordan ................................. 303/115
3,684,328  8/1972   Koivunen ............................... 303/92
3,985,399  10/1976  Mayer ................................... 303/92

Primary Examiner—Trygve M. Blix
Assistant Examiner—Douglas C. Butler
Attorney, Agent, or Firm—Finnegan, Henderson, Farabow & Garrett

[57] ABSTRACT

An anti-skid brake control system comprises a cylinder casing having a first chamber connected with a master cylinder and a second chamber in communication with wheel brake cylinders, a cut-off valve disposed within the first chamber for selectively interrupting fluid communication between the first and second chambers, and a hydraulic capacity controller including a plunger axially reciprocable within the first chamber and operatively engaged at its both ends with the cut-off valve and a piston reciprocable within a vacuum servo-motor, the plunger being retracted by the piston to activate the cut-off valve and thereafter to increase the capacity of the second chamber to decrease the braking pressure applied to the wheel brake cylinders. The control system further comprises a relief valve interposed between the second chamber of the casing and a reservoir of the master cylinder to be opened when the capacity of the second chamber is maximized by retraction of the plunger, and an orifice interposed between the relief valve and the reservoir for controlling fluid flow from the second chamber to the reservoir.

11 Claims, 6 Drawing Figures

MODULATOR FOR ANTI-SKID BRAKE CONTROL SYSTEM

BACKGROUND OF THE INVENTION

The present invention relates to anti-skid brake control systems for wheeled vehicles, and more particularly to an improvement of the system of a type comprising a cut-off valve and a hydraulic capacity controller disposed within a hydraulic braking cirucit connecting a master cylinder to wheel brake cylinders, wherein in an anti-skid operation, the cut-off valve interrupts fluid communication between the master cylinder and the wheel cylinders and then the capacity controller is conditioned for its pressure decreasing operation for effecting the anti-skid operation.

In the conventional anti-skid brake control system of this kind, the hydraulic capacity controller includes a plunger axially movable within a cylinder casing disposed within the braking circuit and operatively connected at both ends thereof with the cut-off valve and a servo-motor respectively. The plunger is operated by the servo-motor to increase the capacity of the casing on activation of the cut-off valve thereby to decrease the pressure in the braking circuit, In this assembling construction, it is necessary that the capacity of the cylinder casing be increased by retraction of the plunger to decrease the braking pressure applied to the wheel cylinders from the maximum value to the minimum value. Particularly, the retracting stroke of the plunger is mainly consumed to reduce the braking pressure to a low value. As a result, the axial length of hydraulic capacity controller becomes large and the servo-motor requires large amount of vacuum.

SUMMARY OF THE INVENTION

It is, therefore, an object of the present invention to provide an anti-skid brake control system, wherein a hydraulic capacity controller for the system is compactly constructed in its axial length to facilitate the adaptation of the control system to the wheeled vehicle and wherein a vacuum servo-motor for the capacity controller is also compactly constructed to improve the sensitivity of the control system and reduce vacuum consumption of an intake manifold of the vehicle engine.

It is another object of the present invention to provide an anti-skid brake control system, wherein in releasing of the normal locking of the wheels, the braking pressure applied to the wheel cylinders is decreased by increasing the capacity of a cylinder casing disposed within the braking circuit and in releasing the excessive locking of the wheels, the interior of the casing is momentarily connected to a fluid reservoir of the master cylinder to further decrease the braking pressure.

Accordingly, in the preferred embodiment of the present invention, the above mentioned objects are accomplished by providing an anti-skid brake control system which comprises an electric skid-sensor for generating a signal therefrom in response to a predetermined wheel locking condition, a vacuum servo-motor including a piston pneumatically operated in response to the signal from the skid-sensor; a cylinder casing having a first fluid chamber connected with a master cylinder and a second fluid chamber in communication with wheel brake cylinders, a cut-off valve disposed within the first fluid chamber of the casing for selectively interrupting fluid communication between the first and second fluid chambers, and a hydraulic capacity controller including a plunger axially reciprocable within the second fluid chamber of the casing operatively engaged at the forward end thereof with the cut-off valve and at the rearward end thereof with the piston of the servo-motor, the plunger being retracted toward the rearward stroke end thereof by the piston to activate the cut-off valve and therafter to increase the capacity of the second fluid chamber to decrease the braking pressure applied to the wheel brake cylinders, and further comprises a relief valve interposed between the second fluid chamber of the casing and a reservoir of th master cylinder to momentarily connect the second fluid chamber to the reservoir after the capacity of the second fluid chamber is maximized by retraction of the plunger, the relief valve being normally closed to be opened when the plunger is retracted to the rearward stroke end thereof, and flow regulating means interposed between the relief valve and the reservoir for controlling fluid flow from the second fluid chamber to the reservoir.

Furthermore, in accordance with the present invention, the above-mentioned embodiment may be modified such that the control system comprises a detector for generating a signal therefrom when the plunger is retracted to the rearward stroke end therof to maximize the capacity of the second fluid chamber a relief valve disposed within a hydraulic circuit connecting the wheel brake cylinders to a reservoir of the master cylinder to provide fluid communication between the wheel brake cylinders and the reservoir after the capacity of the second fluid chamber is maximized by retraction of the plunger, the relief valve being normally closed to be opened in response to the signal from the detector, and flow-regulating means interposed between the relief valve and the reservoir for controlling fluid flow from the wheel brake cylinders to the reservoir.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
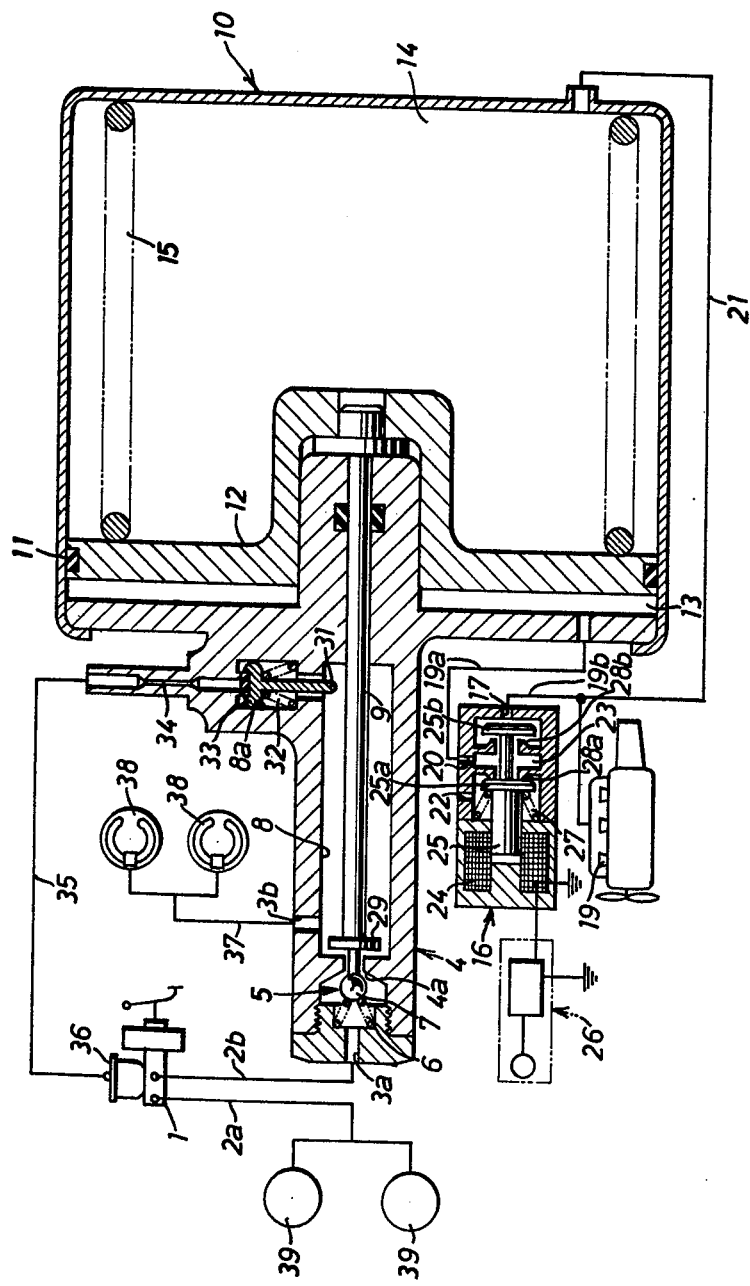
FIG. 1 illustrates an elevational section of a first embodiment in accordance with the present invention.

Referring now to the drawings, FIG. 1 illustrates a vehicle wheel anti-skid brake control system in which a first hydraulic circuit is formed with a master cylinder 1 and a hydraulic conduit 2a in direct connection with front wheel brake cylinders 39 of front wheels and a second hydraulic circuit is formed with the master cylinder 1, a hydraulic conduit 2b in connection with an inlet port 3a of a cylinder casing 4, a cut-off valve assembly 5 in the casing 4, a hydraulic capacity controller including a plunger 9 in the casing 4 and a hydraulic conduit 37 leading from an outlet port 3b of the casing 4 to rear wheel brake cylinders 38 of rear wheels. The cut-off valve assembly 5 comprises an annular valve seat 4a provided within the casing 4 and a ball valve 7 biased by a spring 6 toward the valve seat 4a. The ball valve 7 is normally held apart from the valve seat 4a by way of the forward end of the plunger 9. This cut-off valve 5 is closed by retracting movement of the plunger 9 to interrupt fluid communication between the master cylinder 1 and the rear wheel cylinders 38.

In the hydraulic capacity controller, the plunger 9 is axially movable in a cylindrical bore 8 of the casing 4 and operatively connected at the rearward end thereof with a servo-motor 10. This plunger 9 is retracted by the servo-motor 10 when the rear wheels are locked so that the cut-off valve 5 closes and subsequently the capacity of the bore 8 increases to decrease the braking pressure applied to the rear wheel cylinders 38. The servo-motor 10 is provided therein with a piston 12 connected with the rearward end of the plunger 9. The piston 12 is reciprocably disposed within the interior of the servo-motor 10 and is normally biased by a compression spring 15 to urge the plunger 9 for keeping the ball valve 7 apart from the valve seat 4a and minimizing the capacity of the bore 8. The interior of the servo-motor 10 is hermetically divided into two chambers 13 and 14 by an annular seal member 11, which is secured to the periphery of the piston 12. The chamber 13 is connected to a vacuum source of an intake-manifold 19 through a conduit 19a, a pneumatic selector valve 16 and a bypass conduit 19b, while the chamber 14 is directly connected to the vacuum source 19 through a conduit 21.

The pneumatic selector valve 16 is provided to control pneumatic pressure within the chambers 13 and 14 of the servo-motor 10. The selector valve 16 is provided therin with a valve chamber 23, a plunger 25 including valves 25a and 25b and a solenoid 24 to be energized by a signal from an electric skid sensor circuit 26. The valve chamber 23 is in open communication with the chamber 13 of the servo-motor 10 through an outlet port 20. The plunger 25 is normally biased by a spring 27 such that the valve 25a seats on a valve seat 28a, while the valve 25b is apart from a valve seat 28b to connect the valve chamber 23 to a vacuum port 17 in connection with the bypass conduit 19b. The skid sensor 26 is in operative connection with rear wheels for issuing a signal in a predetermined locked condition of the rear wheels. In this pneumatic selector valve 16, when the solenoid 24 is energized by a signal from the skid sensor 26, the plunger 25 is moved against biasing force of the spring 27 so that the valve 25a is separated from the valve seat 28a to connect the valve chamber 23 to the atmospheric pressure through an air port 22, while the valve 25b seats on the valve seat 28b to close the valve chamber 23 against the vacuum port 17.

Figure 2:
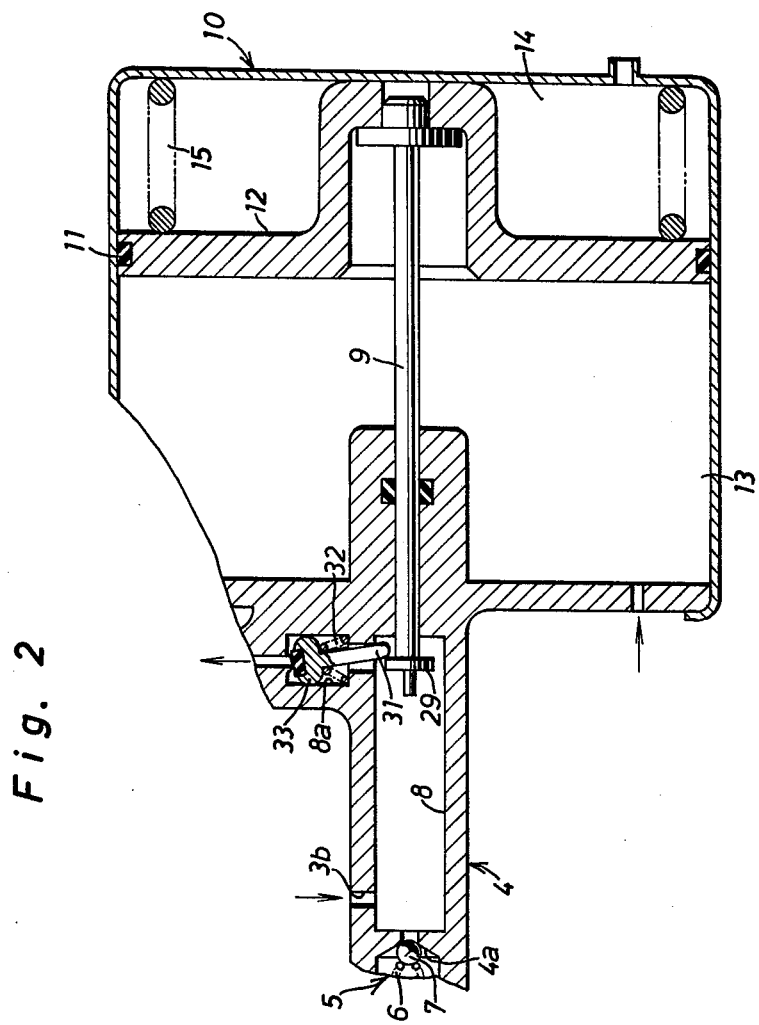
FIG. 2 is a view similar to FIG. 1, but illustrating a tipping relief valve opened by the forward end of a plunger.

The cylinder casing 4 is also provided with another bore 8a at the rearward end of the cylindrical bore 8. The upper end of the bore 8a is connected to a fluid reservoir 36 by way of an orifice 34 and a conduit 35. Within the bore 8a, a tipping relief valve 33 is biased upwardly by a compression spring 32 and seats against the upper wall of the bore 8a to normally close the orifice 34. The stem 31 of the tipping valve 33 depends into the cylindrical bore 8 to be moved by a head 29 of the plunger 9. In this assembly, when the plunger 9 is retracted by the servo-motor 10 to the rearward stroke end thereof to maximize the capacity of the cylindrical bore 8, as shown in FIG. 2, the tipping valve 33 will open by engagement of the stem 31 against the head 29 of the plunger 9 to connect the interior of the bore 8 to the reservoir 36 through the orifice 34. In other words, after the capacity of the bore 8 is increased in maximum by retraction of the plunger 9, the tipping valve 33 is opened to permit fluid flow from the bore 8 to the reservoir 36 so that the braking pressure applied to the rear wheel cylinders is further controlled by throttling of the orifice 34 to release the locking of the rear wheels.

Figure 3:
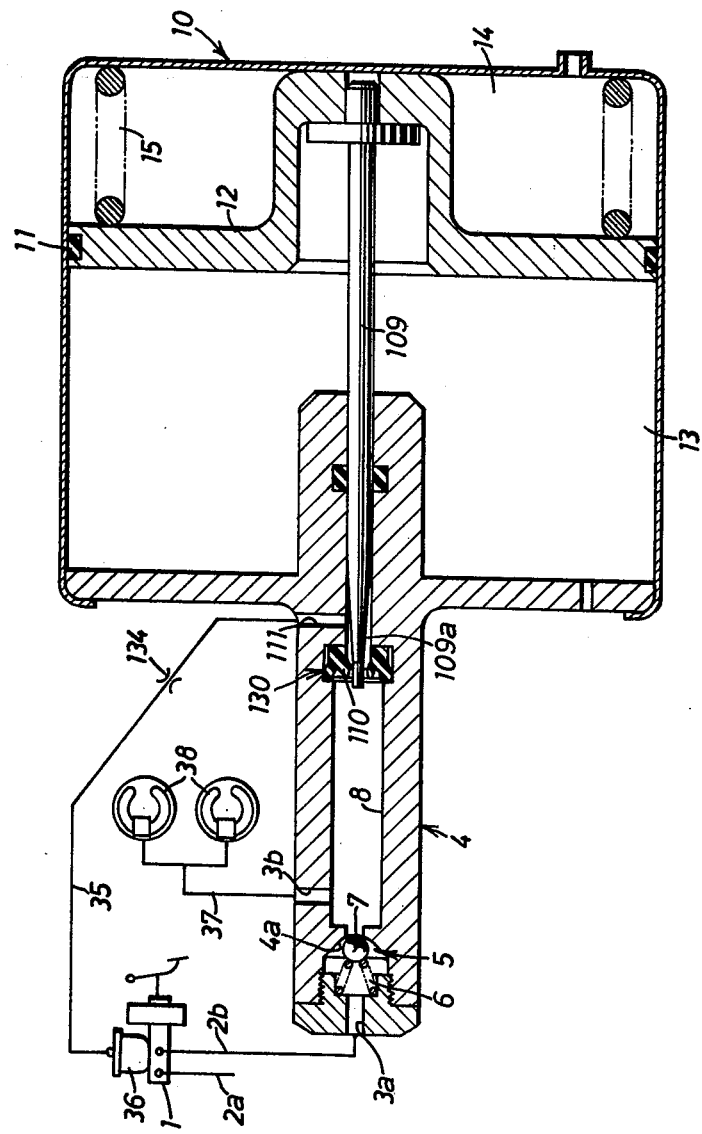
FIG. 3 illustrates an elevational section of a modification of the first embodiment.

In FIG. 3, there is illustrated a modification of the above embodiment in which a relief valve 130 is formed with an annular valve member 110 and a taper portion 109a of a plunger 109 and a relief port 111 on the casing 4 is connected to the reservoir 36 by way of the conduit 35 and an orifice 134. The valve member 110 is located at the rearward end of the cylindrical bore 8 to slidably receive the plunger 109, which corresponds with the plunger 9 of the above embodiment. All other constructions are the same as those in the above embodiment with the same reference numerals for the same component parts and portions. In this assembly, when the plunger 109 is loaded in the forward stroke end to open the cut-off valve 5, the relief valve 130 is closed by the medium portion of the plunger 109. When the plunger 109 is retracted by the servo-motor 10 to the rearward stroke end, as shown in FIG. 3, the relief valve 130 will open to connect the interior of the bore 8 to the reservoir 36 through the port 111 and the orifice 134 so that the braking pressure applied to the rear wheel cylinders is controlled by throttling of the orifice 134.

Figure 4:
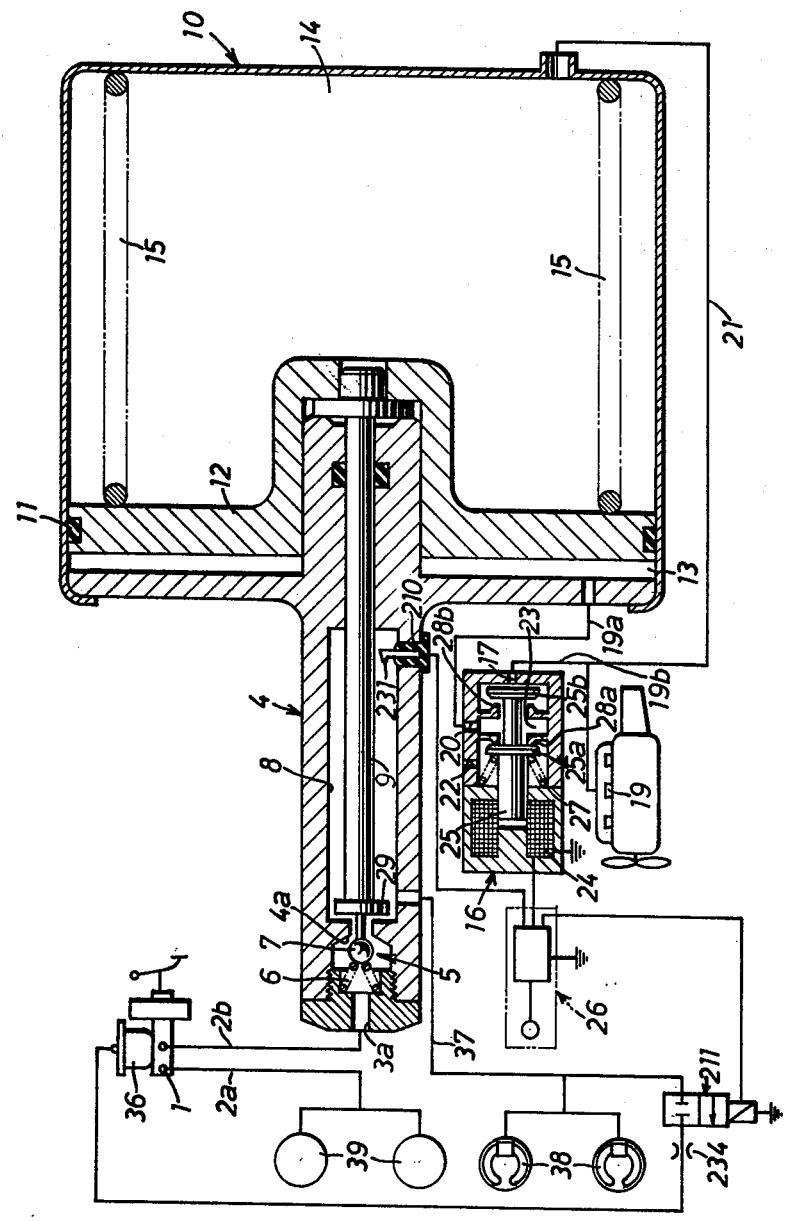
FIG. 4 illustrates an elevational section of another modification of the first embodiment.

Another modification of the above embodiment is disclosed in reference with FIG. 4, in which an electric feeler 231 is mounted on the casing 4 through an insulator 210 to be engaged with the head 29 of the plunger 9 at the rearward stroke end. The feeler 231 is electrically connected to a solenoid valve 211 by way of the skid sensor circuit 26 in such a manner that the solenoid valve 211 is energized by an electric signal from the skid sensor circuit 26 upon engagement of the feeler 231 against the head 29 of the plunger 9. This modification is further characterized in that the hydraulic conduit 37 for the rear wheel cylinders 38 is connected to the reservoir 36 by way of the solenoid valve 211 and an orifice 234. All other constructions remain unchanged with the same reference numerals for the same component parts and portions. In this modification, when the plunger 9 is loaded in the forward stroke end thereof to open the cut-off valve 5, the solenoid valve 211 interrupts fluid communication between the hydraulic conduit 37 and the reservoir 36. When the plunger 9 is retracted by the servo-motor 10 to the rearward stroke end, the feeler 231 engages the head 29 of the plunger 9 to issue an electric signal from the skid sensor circuit 26 so that the solenoid valve 211 is energized by the signal to connect the hydraulic conduit 37 to the reservoir 36 therethrough. Thus, the braking pressure applied to the rear wheel cylinders is controlled by throttling of the orifice 234.

In operation of the respective embodiments described above, when the normal braking operation is conducted by depressing actuation of the master cylinder 1, the braking fluid pressure exerted in the master cylinder is applied to the front wheel cylinders 39 through the first hydraulic circuit and applied to the rear wheel cylinders 38 through the second hydraulic circuit. During this braking operation, the servo-motor 10 remains inoperative and the plunger 9 or 109 remains unmoved because of the biasing force of the compression spring 15 of the servo-motor 10. Thus, the cut-off valve 5 is opened by the forward end of the plunger 9 or 109 and the capacity of the cylindrical bore 8 is minimized.

In such braking operation as causes locking on the rear wheels, the wheel locking degree is detected by the skid sensor circuit 26 so that the solenoid 24 of the pnuematic selector valve 16 is energized by an electric signal from the sensor circuit 26 to attract the plunger 25 against the biasing force of the spring 27. Then, the valve 25a is separated from the valve seat 28a to connect the valve chamber 23 to the atmospheric pressure, while the valve 25b seats on the valve seat 28b to close the valve chamber 23 against the vacuum port 17. Thus, the atmospheric pressure is applied into the chamber 13 of the servo-motor 10 by way of the valve chamber 23 to yield a difference in pressure between the two pneumatic chambers 13 and 14 so that the piston 12 is retracted against the spring 15 and subsequently the plunger 9 or 109 retracted by the hydraulic pressure within the cylindrical bore 8. This closes the cut-off valve 5 and increases the capacity of the bore 8 to decrease the braking pressure so as to release the locking of the rear wheels.

During the above mentioned operation, if the locking degree is large, the plunger 9 or 109 is retracted to the rearward stroke end thereof to maximize the capacity of the cylindrical bore 8. Then, in the embodiment of FIG. 1, the tipping valve 33 is opened by engagement of the valve stem 31 against the head of the plunger 9 to conduct fluid communication between the bore 8 and the reservoir 36, and in the modification of FIG. 3, the relief valve 130 is opened to connect the bore 8 to the reservoir 36. Also, in the modification of FIG. 4, the solenoid valve 211 is energized by a signal from skid sensor circuit 26 to connect the hydraulic conduit 37 to the reservoir 36. Thus, the decreasing of the braking pressure is controlled by throttling of the orifice 34, 134 or 234 to ensure the effective braking operation.

Upon releasing of the rear wheel locking, the signal from the skid sensor circuit 26 ceases and then the solenoid 24 of the pneumatic selector valve 16 is deenergized. This results in closing of the valve 25a and opening of the valve 25b in the selector valve 16. Thus, the chamber 13 of the servo-motor 10 is connected to the vacuum source 19 by way of the valve chamber 23, the vacuum port 17 and the bypass conduit 19b to decrease the difference in pressure between the chambers 13 and 14 in the servo-motor 10 so that the piston 12 is moved forwardly by returning force of the spring 15 to return the plunger 9 or 109 toward the forward stroke end. As a result, the tipping valve 33, the relief valve 130 or the solenoid valve 211 closes to interrupt the fluid communication between the bore 8 and the reservoir 36 and subsequently the capacity of the bore 8 is minimized to increase the braking pressure applied to the rear wheel cylinders. Thereafter, the cut-off valve 5 is opened again by engagement of the ball valve 7 against the forward end of the plunger to permit the fluid communication between the master cylinder 1 and the rear wheel cylinders 38.

Figure 5:
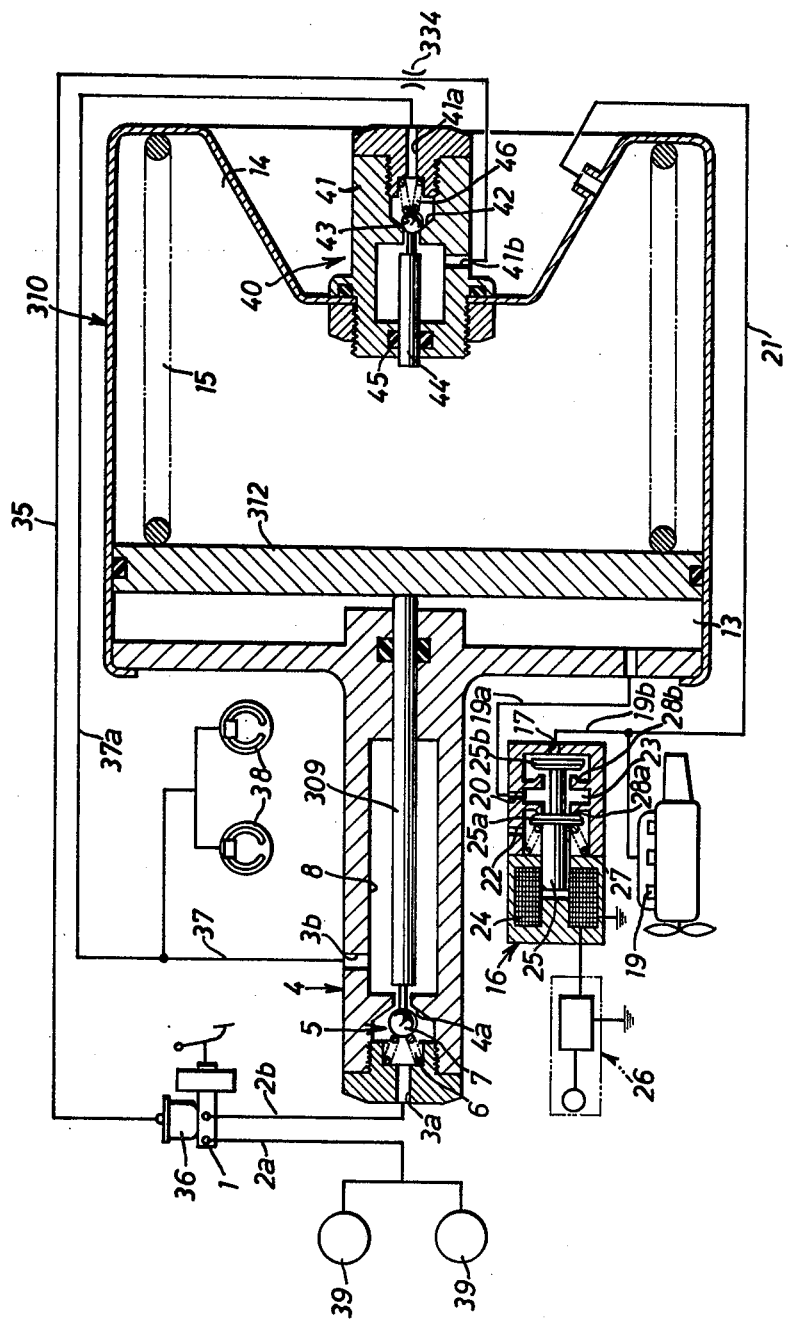
FIG. 5 illustrates an elevational section of a second embodiment in accordance with the present invention.

FIG. 5 illustates a second embodiment of the present invention, in which a plunger 309 is axially movable in the cylindrical bore 8 of the casing 4 and engaged with a piston 312 in a servo-motor 310, the plunger 309 and the servo-motor 310 corresponding with the plunger 9 and the servo-motor 10 of the first embodiment shown in FIG. 1. The servo-motor 310 is provided at the back side thereof with a relief valve assembly 40. This valve assembly 40 comprises a valve casing 41 which is mounted on the back side wall of the servo-motor 310 and provided thereon with an inlet port 41a and an outlet port 41b. The inlet port 41a is connected to the hydraulic conduit 37 for the rear wheel cylinders 38 through a bypass conduit 37a and the outlet port 41b is connected to the reservoir 36 through the conduit 35 and an orifice 334. The valve casing 41 includes an annular valve seat 42, a ball valve 43 biased by a spring 46 toward the valve seat 42, and a push rod 44 axially slidable through a seal member 45 and a base wall of the casing 41. In this assembly, the ball valve 43 seats on the valve seat 42 to normally close the relief valve 40 and the push rod 44 extends from the casing 41 into the interior of the servomotor 310. When the piston 312 is retracted to the rearward stroke end thereof, the push rod 44 is moved rearwardly by the piston 312 to open the relief valve 40 thereby to connect the rear wheel cylinders 38 to the reservoir 36 by way of the orifice 334. Thus, the braking pressure applied to the rear wheel cylinders 38 is controlled by throttling of the orifice 334. All other constructions are the same as those in the first embodiment with the same reference numerals for the same component parts and portions.

Figure 6:
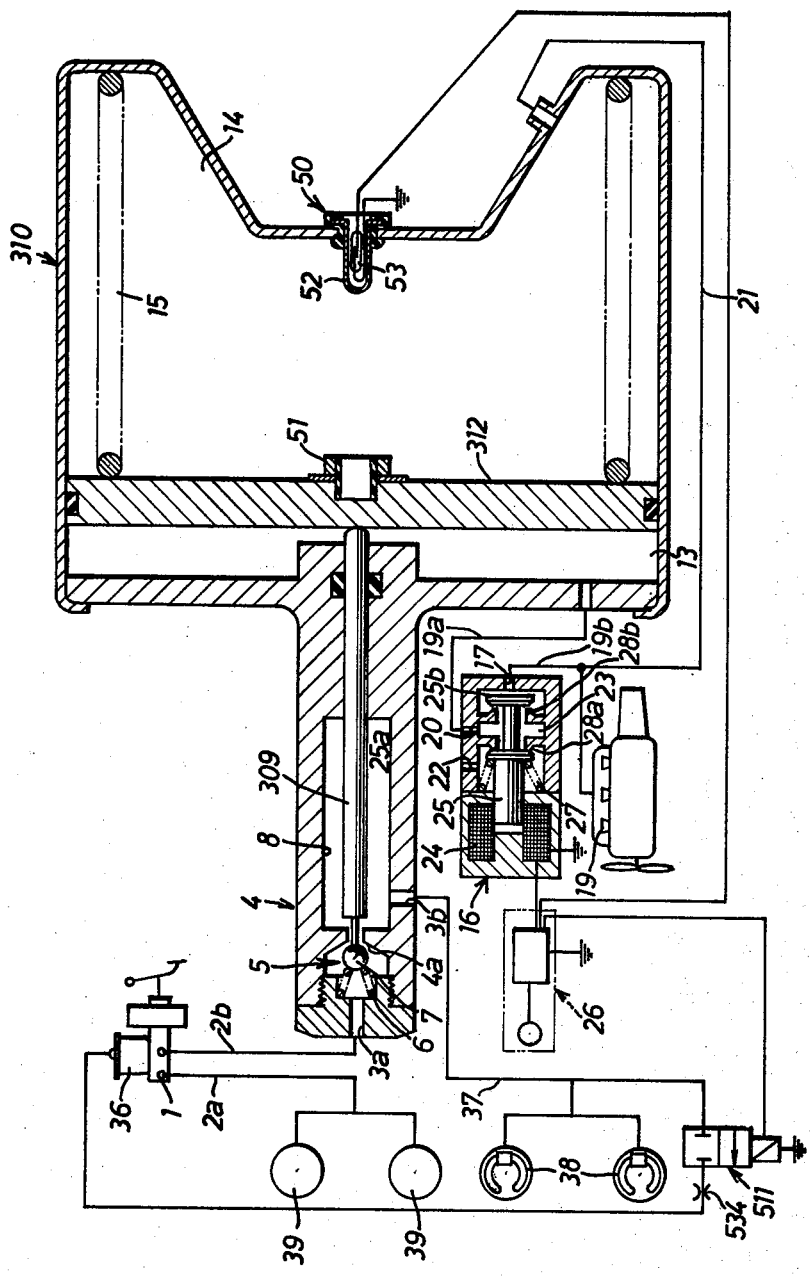
FIG. 6 illustrates an elevational section of a modification of the second embodiment.

In FIG. 6, there is illustrated a modification of the second embodiment, in which the servo-motor 310 is provided at the back side thereof with a limit switch assembly 50 to detect the rearward stroke end of the piston 312 or the plunger 309. The limit switch assembly 50 comprises a tubular permanent magnet 51 secured to the back side of the piston 312 and a normally open reed switch 53 housed within a plug 52, which is secured to the back side of the servo-motor 310 co-axially with the magnet 51. The reed switch 53 is electrically connected to a solenoid valve 511 by way of the skid sensor circuit 26 in such a manner that the solenoid valve 511 is energized by an electric signal from the skid sensor circuit 26 upon closing of the reed switch 53. In this modification, the hydraulic conduit 37 for the rear wheel cylinders 38 is connected to the reservoir 36 of the master cylinder 1 by way of the solenoid valve 511 and an orifice 534. All other constructions remain unchanged with the same reference numerals for the same component parts and portions. With this modification, when the plunger 309 is loaded in the forward stroke end thereof to open the cut-off valve 5, the reed switch 53 opens and the solenoid valve 511 is closed to block fluid communication between the hydraulic conduit 37 and the reservoir 36. When the plunger 309 is retracted by the servo-motor 310 to the rearward stroke end thereof to maximize the capacity of the cylindrical bore 8, the reed switch 53 is closed by magnetic flux of the magnet 51 to generate an electric signal from the skid sensor circuit 26 so that the solenoid valve 511 is energized by the signal to connect the hydraulic conduit 37 to the reservoir 36 therethrough. Thus, the braking pressure applied to the rear wheel cylinders is controlled by throttling of the orifice 534.

From the above detailed description, it will be noted that in releasing the normal locking of the rear wheels the braking pressure is controlled by variation of the capacity of the cylindrical bore 8 and in releasing of the excessive locking of the rear wheels the braking pressure is further controlled by fluid communication between the bore 8 and the reservoir 36 of the master cylinder 1. This means that the axial length of the cylinder casing for the capacity controller becomes shorter and also the retracting stroke of the piston in the servo-motor becomes shorter. Thus, the servo-motor for the capacity controller may be compactly constructed in size to facilitate the adaptation of the anti-skid control system to the wheeled vehicle. Further, the compactness of the servo-motor serves to improve the sensitivity of the system and to reduce vacuum consumption of the intake manifold of the vehicle engine.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. In an anti-skid brake control system for a wheeled vehicle having a master cylinder with a hydraulic fluid reservoir, at least one wheel brake cylinder and a hydraulic braking circuit connecting said master cylinder to said at least one wheelbrake cylinder, the system comprising: skid-sensing means for generating a signal therefrom in response to a predetermined wheel-locking conditon; a servo-motor including a piston operated in response to the signal from said skid-sensing means; a cylinder casing having a first fluid chamber connected with said master cylinder and a second fluid chamber in communication with said at least one wheel brake cylinder; cut-off valve means disposed within said first fluid chamber of said casing for interrupting fluid communication between said first and second fluid chambers; and hydraulic capacity control means including a plunger axially movable within said second fluid chamber of said casing and operatively engaged at the forward end thereof with said cut-off valve means and at the rearward end thereof with said piston of said servo-motor, said plunger being retracted toward the rearward stroke end thereof by the rearward stroke of said piston to activate said cut-off valve means and thereafter to increase the capacity of said second fluid chamber to decrease the braking pressure applied to said at least one wheel brake cylinder;

the improvement comprising braking pressure-relief valve means interposed between said second fluid chamber of said casing and said hydraulic fluid reservoir of said master cylinder for permitting fluid flow from said second fluid chamber to said reservoir, said pressure-relief valve means being normally closed and being openable for permitting fluid flow from said second fluid chamber to said reservoir to further decrease the braking pressure applied to said at least one wheel brake cylinder after the capacity of said second fluid chamber is substantially maximized by retraction of said plunger to the rearward stroke end thereof; and flow-regulating means interposed between said relief valve means and said reservoir for controlling fluid flow from said second fluid chamber to reservoir.

2. The improvement in the anti-skid brake control system as claimed in claim 1, wherein said normally closed pressure-relief valve means is assembled within the rearward end of said second fluid chamber and cooperable with the forward end of said plunger for actuation and wherein said flow-regulating means is an orifice provided in said casing between said pressure-relief valve and said reservoir of said master cylinder.

3. The improvement in the anti-skid brake control system as set forth in claim 2, wherein said plunger has a head formed on the forward end thereof and wherein said pressure-relief valve means includes a bore formed in the cylinder casing at the rearward end of said second fluid chamber and connected at one end with said second fluid chamber and at the other end with said orifice, and a tipping valve seated in said bore and having a stem depending into said rearward end of said second fluid chamber, said tipping valve being normally biased to close said bore from fluid flow and being openable for permitting fluid flow from said second fluid chamber through said bore and said orifice to said reservoir by engagement of said stem of said tipping valve with said head of said plunger when the capacity of said second fluid chamber is substantially maximized by retraction of the forward end of said plunger in said second fluid chamber to the rearward stroke end thereof.

4. An anti-skid brake control system as claimed in claim 1, wherein said cylinder casing is provided at the rearward end thereof with relief port in communication with said reservoir of said master cylinder by way of said flow regulating means and wherein said relief valve means comprises an annular valve member disposed within the rearward end of said second fluid chamber and co-operable with the tapered forward end of said plunger to permit fluid flow from said second fluid chamber to said reservoir through said relief port and said flow regulating means.

5. An anti-skid brake control system as claimed in claim 1, wherein said relief valve means is a normally closed relief valve assembled with said servo-motor and co-operable with said piston when retracted to its rearward stroke end.

6. In an anti-skid brake control system for a wheeled vehicle having a master cylinder, wheel brake cylinders and a hydraulic braking circuit connecting said master cylinder to said wheel brake cylinders, comprising: skid-sensing means for generating a signal therefrom in response to a predetermined wheel locking condition; a servo-motor including a piston pneumatically operated in response to the signal from said skid-sensing means; a cylinder casing having a first fluid chamber connected with said master cylinder and a second fluid chamber in communication with said wheel brake cylinders; cut-off valve means disposed within said first fluid chamber of said casing for selectively interrupting fluid communication between said first and second fluid chambers; and hydraulic capacity control means including a plunger axially movable within said second fluid chamber of said casing and operatively engaged at the forward end thereof with said cut-off valve means and at the rearward end thereof with said piston of said servo-motor, said plunger being retracted toward the rearward stroke end thereof by said piston to activate said cut-off valve means and thereafter to increase the capacity of said second fluid chamber to decrease the braking pressure applied to said wheel brake cylinders;

the improvement comprising detecting means for generating a signal therefrom when said plunger is retracted to the rearward stroke end thereof to maximize the capacity of said second fluid chamber; relief valve means disposed within a hydraulic circuit connecting said wheel brake cylinders to a reservoir of said master cylinder to provide fluid communication between said wheel brake cylinders and said reservoir after the capacity of said second fluid chamber is maximized by retraction of said plunger, said relief valve means being normally closed to be opened in response to the signal from said detecting means; and flow regulating means interposed between said relief valve means and said reservoir for controlling fluid flow from said wheel brake cylinders to said reservoir.

7. An anti-skid brake control system as claimed in claim 6, wherein said detecting means comprises a feeler arranged within the rearward end of said second fluid chamber and co-operable with the forward end of said plunger.

8. An anti-skid brake control system as claimed in claim 7, wherein said relief valve means is a solenoid valve disposed within said hydraulic circuit between said wheel brake cylinders and said reservoir to be energized in response to a signal generated from said feeler.

9. An anti-skid brake control system as claimed in claim 6, wherein said detecting means is a magnetically operated switch means assembled with the rearward end wall of said servo-motor and co-operable with a permanent magnet secured to said piston, said switch means being activated by magnetic flux of said magnet when said piston is retracted to the rearward stroke end thereof to maximize the capacity of said second fluid chamber.

10. An anti-skid brake control system as claimed in claim 9, wherein said relief valve means is a solenoid valve disposed within said hydraulic circuit between said wheel brake cylinders and said reservoir to be energized in response to a signal generated from said switch means.

11. In an anti-skid brake control system for a wheeled vehicle having a master cylinder with a hydraulic fluid reservoir, at least one wheel brake cylinder and a hydraulic braking circuit connecting said master cylinder to said at least one wheel brake cylinder, the system including: skid-sensing means for generating a signal therefrom in response to a predetermined wheel-locking condition; a servo-motor including a piston operated rearwardly in response to the signal from said skid-sensing means; a cylinder casing having a first fluid chamber in fluid communication with said master cylinder and a second fluid chamber in fluid communication with said at least one wheel brake cylinder; cut-off valve means for interrupting fluid communication between said first and second fluid chambers; and hydraulic capacity control means including a plunger axially movable within said second fluid chamber of said casing and operatively engaged at the forward end thereof with said cut-off valve means and at the rearward end thereof with said piston of said servo-motor, said plunger being retracted toward the rearward stroke end thereof by the rearward stroke of said piston to activate said cut-off valve means and thereafter to increase the capacity of said second fluid chamber to decrease the braking pressure applied said at least one wheel brake cylinder;

the improvement comprising a hydraulic braking pressure-relief circuit connecting said at least one wheel brake cylinder to the hydraulic fluid reservoir of the master cylinder; a normally closed pressure-relief valve in said hydraulic braking pressure-relief circuit, said pressure-relief valve being openable for permitting fluid flow from said at least one wheel brake cylinder to said hydraulic fluid reservoir to further decrease the braking pressure applied to said at least one wheel brake cylinder; and means responsive to the rearward stroke of said piston, after the capacity of said second fluid chamber is substantially maximized by retraction of said plunger to the rearward stroke end thereof, for opening said pressure-relief valve to permit the fluid flow from said at least one wheel brake cylinder to the reservoir.

* * * * *

UNITED STATES PATENT AND TRADEMARK OFFICE
CERTIFICATE OF CORRECTION

PATENT NO. : 4,095,851

DATED : June 20, 1978

INVENTOR(S) : Masamoto Ando et al

It is certified that error appears in the above-identified patent and that said Letters Patent are hereby corrected as shown below:

Claim 1:

Column 7, line 60, before "relief", insert --pressure--.

Column 7, line 62, before "reservoir", insert --said--.

Signed and Sealed this

Twenty-seventh Day of March 1979

[SEAL]

Attest:

RUTH C. MASON
Attesting Officer

DONALD W. BANNER
Commissioner of Patents and Trademarks